United States Patent Office
3,749,756
Patented July 31, 1973

3,749,756
PREPARATION METHOD OF CARBOXYLATED POLYMER
Yujiro Kosaka, Masaru Uemura, and Tokio Fujiki, Shin Nanyo, Japan, assignors to Toyo Soda Manufacturing Co. Ltd., Shin Nanyo-shi, Yamaguchi, Japan
No Drawing. Filed Sept. 24, 1971, Ser. No. 183,616
Claims priority, application Japan, Aug. 6, 1971, 46/58,973
Int. Cl. C08f 15/00
U.S. Cl. 260—878 R         7 Claims

ABSTRACT OF THE DISCLOSURE

A carboxylated polymer is produced by copolymerizing 5–80 parts by weight of a monomeric mixture of maleic anhydride and an alkyl acrylate, in contact with 95–20 parts by weight, of an ethylene-vinyl acetate copolymer having a vinyl acetate content of at least 5%, using a free radical polymerization initiator.

BACKGROUND OF THE INVENTION

Field of the invention

This invention relates to a novel carboxylated polymer which is useful as a base for the preparation of molding compounds, paints, and adhesives, and more particularly to a method of producing a carboxylated polymer by polymerizing maleic anhydride and alkyl acrylate in the presence of an ethylene-vinyl acetate copolymer.

Description of prior art

It is well known that maleic anhydride can be introduced into a polymer by copolymerization with another comonomer or by an addition reaction. Maleic anhydride containing copolymers, however, are ordinarily so brittle, that they are generally unfit for use in molding compositions. Hence, their use has been limited to the preparation of adhesives or dispersing agents, in which the acid anhydride polarity and the high reactivity of these copolymers are required. When an addition reaction is used to introduce maleic anhydride into a polymer, a still further drawback pertains, in that a significant degree of discoloration can occur, and the reaction is accompanied by an undesirably high degree of catalyst consumption.

It would be desirable to provide a maleic anhydride copolymer which retains the desirable acid anhydride polarity and high reactivity, yet which has a significantly wider application than the prior art copolymers.

SUMMARY OF THE INVENTION

Accordingly, it is one object of the present invention to provide a copolymer characterized by acid anhydride polarity and high reactivity, which can be used as a base in the preparation of molding compounds, paints or adhesives.

A further object of this invention is to provide a graft polymerization method for providing said copolymer.

These and other objects have now herein been attained by copolymerization of maleic anhydride and alkyl acrylate in the presence of an ethylene-vinyl acetate copolymer, whereby the maleic anhydride-alkyl acrylate copolymer is grafted onto the ethylene-vinyl acetate copolymer. The product of the graft polymerization reaction has been found to possess acid anhydride polarity, high reactivity and superior physical properties. Various products, ranging from a soft and pliable nature to a hard and tough consistency, have been obtained by appropriate selection of suitable ethylene-vinyl acetate copolymer, and maleic anhydride-alkyl acrylate composition according to the present invention.

DETAILED DESCRIPTION OF PREFERRED EMBODIMENTS

According to the present invention, maleic anhydride and alkyl acrylate are copolymerized in the presence of an ethylene-vinyl acetate copolymer, using a free radical initiator, to effect grafting of the maleic anhydride and the alkyl acrylate onto the ethylene-vinyl acetate copolymer. The product of this reaction is a copolymer of maleic anhydride-alkyl acrylate grafted onto ethylene-vinyl acetate copolymer, in combination with a copolymer of maleic anhydride and alkyl acrylate.

The reaction of the present invention may be conveniently carried out by dissolving, swelling or dispersing a given amount of the ethylene-vinyl acetate copolymer with maleic anhydride and alkyl acrylate. Polymerization is then effected with a free radical polymerization initiator.

There is no limitation on the composition of the ethylene-vinyl acetate copolymer, and the actual ratio of ethylene to vinyl acetate monomers used in forming the copolymer will be dictated by the requirements of the end use properties. In general, the higher the quantity of vinyl acetate used, the higher will be the graft efficiency. Good results are obtainable when the vinyl acetate content is greater than 5%, and preferably between 10% and 70% by weight.

There is no limitation as to the molecular weight of the ethylene-vinyl acetate copolymer, but it is desirable that the molecular weight be such that the copolymer possesses good melt flow properties. When superior mechanical properties are desired, it is best to use a low melt index ethylene-vinyl acetate copolymer, but a high melt index ethylene-vinyl acetate copolymer can also be used with good results, depending on the desired end use. The most desirable melt index of the ethylene-vinyl acetate copolymer ranges from 0.1 to 500 gms./10 mins.

The monomeric mixture of maleic anhydride and alkyl acrylate for the copolymerization reaction, should desirably, contain 1–80% by weight maleic anhydride to 99–20% by weight alkyl acrylate.

As used in the present application, the term "acrylate" is intended in its broader connotation which includes the acrylates and the methacrylates. Whenever "acrylate" is referred to, therefore, where the connotation justifies, the term "methacrylate" is also contemplated.

Suitable alkyl acrylates and methacrylates used in this invention have a structure of:

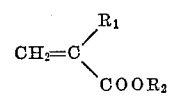

in which $R_1$ is H or $CH_3$, and $R_2$ is an alkyl radical of from one to 20 carbon atoms. Good results are obtainable, for instance, with such alkyl acrylates, as methyl acrylate, ethyl acrylate, n-butyl acrylate, lauryl acrylate, stearyl acrylate, iso-butyl acrylate, t-butyl acrylate, 2-ethylhexyl acrylate, methyl methacrylate, butyl methacrylate and 2-ethylhexyl methacrylate.

The ratio of maleic anhydride-alkyl acrylate monomeric mixture to the ethylene-vinyl acetate copolymer should be from 5–80 parts by weight monomeric mixture to 95–20 parts by weight copolymer.

A free radical polymerization initiator may be used for the copolymerization reaction, although its use depends upon the particular polymerization temperature selected. Suitable initiators include such organic peroxides as, the dialkyl, diacyl and peroxyester peroxides, including dicumyl peroxide, di-t-butyl peroxide, t-butyl peroxybenzoate, t-butyl peroxyisobutyrate, t-butyl peroxyoctoate, t-butyl peroxyacetate, t-butyl peroxypivalate, lauroyl peroxide, benzoyl peroxide and acetyl peroxide, etc. These free radical polymerization initiators may be used in the range of 0.1 to 10% by weight, based on the weight of monomers to be polymerized.

The polymerization reaction can be carried out in the range of from 20° C. to 150° C.

The polymerization may be effected in solution, emulsion, suspension or bulk processes.

Suitable solvents which may be used in carrying out the solution process include aromatic hydrocarbons, such as benzene, toluene and xylene, and aliphatic hydrocarbons, such as hexane, kerosene and petroleum ether.

The product of the present invention consists of a copolymer of a maleic anhydride-alkyl acrylate, grafted onto a copolymer of ethylenevinyl acetate, in combination with a copolymer of maleic anhydride and alkyl acrylate, and shows various properties according to the composition. The molecular weight of the product may be 5000 to 1,000,000, and it will vary according to polymerization conditions.

The product of the present invention can be molded or formed into a sheet or film by using the same conventional molding techniques as are used for ordinary polyethylene, and these sheets, films or moldings have been found to have superior adhesiveness and other superior properties, such as excellent printability and antistatic properties, as compared with currently available ethylene copolymers. These polymers also can be used as a reaction base for ion cross-linkable polymers and further, they can be used to provide improved reinforcement for other polymers and fillers due to their high interfacial adhesiveness.

Having generally described the invention, a further explanation will be obtained by reference to certain specific examples which are provided herein for purposes of illustration only and are not intended to be limiting in any manner. Unless otherwise indicated, all "percent" and "parts" are by weight.

EXAMPLE 1

The following ingredients were charged to a 2 litre autoclave equipped with a stirrer:

| | G. |
|---|---|
| Ethylene-vinyl acetate copolymer (vinyl acetate content 30%, MI 300 g./10 min.) | 200 |
| Maleic anhydride | 106 |
| 2 ethylhexyl acrylate | 200 |
| Benzene | 1000 |

The reactants were dissolved by stirring at 100° C. for 1 hour. And then the following catalysts in a 50 ml. benzene solution were added to the mixture.

| | G. |
|---|---|
| Benzoyl peroxide | 4 |
| t-Butyl peroxybenzoate | 3 |

Polymerization was effected at 100° C. for 6 hours. After the polymerization the product was poured into about 2 litres of methanol, and the polymer was recovered by filtration and dried under reduced pressure. 388 g. of a pliable polymer were obtained. Analysis indicated the polymer contained 6.2% maleic anhydride.

This polymer was compounded by milling on a 2 roll mill at 120° C. and test specimens were prepared from its compression molded plaques. When the physical properties were measured in the same manner as polyethylene, the following results were obtained. The physical properties were compared with the same ethylene-vinyl acetate copolymer which had been used as the reactant, for comparison.

| | Polymer obtained in Example 1 | Ethylene-vinyl acetate copolymer used as a reactant |
|---|---|---|
| Tensile strength (ASTM D638–68T) kg./cm.$^2$ | 48 | 20 |
| Elongation, (ASTM D638–68T) percent | 950 | 500 |
| Torsional stiffness (ASTM D1043–69T) kg./cm.$^2$ | 12 | 25 |
| Vicat softening point (ASTM D1525–65T) ° C., below | 30 | 34 |
| Melt index (ASTM D1238–65T) g./10 min. | 122 | 300 |

EXAMPLE 2

The following ingredients were charged, and polymerization was effected in a similar manner as in Example 1.

| | |
|---|---|
| Ethylene-vinyl acetate copolymer (vinyl acetate content 26%, MI 4 g./10 min.) g. | 400 |
| Maleic anhydride g. | 30 |
| 2 ethylhexylacrylate g. | 60 |
| t-Butyl peroxy isobutyrate g. | 2 |
| Benzene g. | 1000 |
| Polymerization temperature ° C. | 100 |
| Polymerization time hours | 6 |
| Polymer yield (maleic anhydride content 2.4%) g. | 467 |

The physical properties were as follows:

| | |
|---|---|
| Tensile strength (ASTM D638–68T) kg./cm.$^2$ | 136 |
| Elongation (ASTM D638–68T) percent | 741 |
| Torsional stiffness (ASTM D1043–69T) kg./cm.$^2$ | 46 |
| Vicat softening point (ASTM D1525–65T) ° C. | 46 |
| Melt Index (ASTM D1238–65T) g./10 min. | 1.4 |

EXAMPLE 3

The following ingredients were charged, and polymerization was effected in a similar manner as in Example 1.

| | |
|---|---|
| Ethylene-vinyl acetate copolymer (vinyl acetate content 26%, MI 3.5 g./10 min.) g. | 300 |
| Maleic anhydride g. | 49 |
| Ethyl acrylate g. | 50 |
| t-Butyl peroxy benzoate g. | 1.5 |
| Toluene g. | 1000 |
| Polymerization temperature ° C. | 110 |
| Polymerization time hours | 6 |
| Polymer yield (maleic anhydride content 3.0%) g. | 352 |

The physical properties were as follows:

| | |
|---|---|
| Tensile strength (ASTM D638–68T) kg./cm.$^2$ | 133 |
| Elongation (ASTM D638–68T) percent | 748 |
| Torsional stiffness (ASTM D1043–69T) kg./cm.$^2$ | 62 |
| Vicat softening point (ASTM D1525–65T) ° C. | 49 |
| Melt Index (ASTM D1238–65T) g./10 min. | 0.2 |

EXAMPLE 4

The following ingredients were charged, and polymerization was effected in a similar manner as in Example 1.

| | |
|---|---|
| Ethylene-vinyl acetate copolymer (vinyl acetate content 40%, MI 55 g./10 min.) g. | 300 |
| Maleic anhydride g. | 98 |
| Methyl methacrylate g. | 100 |
| t-Butyl peroxy pivalate g. | 1.5 |
| Benzene g. | 1000 |
| Polymerization temperature ° C. | 60 |
| Polymerization time hours | 6 |
| Polymer yield (maleic anhydride content 5.7%) g. | 444 |

The physical properties were as follows:

Tensile strength (ASTM D638–68T) kg./cm.² ____ 75
Elongation (ASTM D638–68T) percent _____ 635
Torsional stiffness (ASTM D1043–69T) kg./cm.² __ 28
Vicat softening point (ASTM D1525–65T) ° C. ___ 43
Melt Index (ASTM D1238–65T) g./10 min. _____ 4.4

EXAMPLE 5

The following ingredients were charged, and polymerization was effected in a similar manner as in Example 1.

Ethylene-vinyl acetate copolymer (vinyl acetate
  content 30%, MI 350 g./10 min.) _____g__ 200
Maleic anhydride _____g__ 162
2 ethylhexyl acrylate _____g__ 300
t-Butyl peroxy benzoate _____g__ 10
Benzene _____g__ 1000
Polymerization temperature _____° C__ 100
Polymerization time _____hours__ 6
Polymer yield (maleic anhydride content
  5.2%) _____g__ 433

The physical properties were as follows:

Tensile strength (ASTM D638–68T) kg./cm.² ____ 32
Elongation (ASTM D638–68T) percent _____ 1095
Torsional stiffness (ASTM D1043–69T) kg./cm.² __ 10
Vicat softening point (ASTM D1525–65T) ° C. __ 30
Melt Index (ASTM D1238–65T) g./10 min. ____ 97

EXAMPLE 6

The following ingredients were charged, and polymerization was effected in a similar manner as in Example 1.

Ethylene-vinyl acetate copolymer (vinyl acetate
  content 19%, MI 24 g./10 min.) _____g__ 100
Maleic anhydride _____g__ 100
n-Butyl acrylate _____g__ 400
Benzoyl peroxide _____g__ 5
Benzene _____g__ 1000
Polymerization temperature _____° C__ 80
Polymerization time _____hours__ 10
Polymer yield (maleic anhydride content
  6.8%) _____g__ 482

The physical properties were as follows:

Tensile strength (ASTM D638–68T) kg./cm.² ____ 102
Elongation (ASTM D638–68T) percent _____ 610
Torsional stiffness (ASTM D1043–69T) kg./cm.² __ 45
Vicat softening point (ASTM D1525–65T) ° C. ___ 34
Melt index (ASTM D1238–65T) g./10 min. _____ 11

EXAMPLE 7

The following ingredients were charged in a 2 liter, four-necked flask fitted with a mechanical stirrer, a thermometer, a reflux condenser and a nitrogen sweep system.

G.
Ethylene-vinyl acetate copolymer (vinyl acetate con-
  tent 26%, MI 3.5 g./10 min.) _____ 80
Maleic anhydride _____ 30
Methyl methacrylate _____ 250
Stearic acid _____ 3

The reactants were dissolved by stirring at 90° C. for 1 hour, and the solution obtained was suspended in 1000 ml. of 0.3% polyvinyl alcohol aqueous solution. 1.5 g. of benzoyl peroxide was added, and polymerization was carried out at 90° C. for 5 hours to give 345 g. of the polymer as fine beads.

The physical properties were as follows:

Tensile strength (ASTM D638–68T) kg./cm.² ____ 165
Elongation (ASTM D638–6T) percent _____ 15
Izod impact strength (ASTM D256–65T) kg./cm.² __ 4.1
Vicat softening point (ASTM D1525–65T) ° C. ____ 92
Melt index (ASTM D1238–65T) g./10 min. _____ 0.01

Having fully described the invention, it will be apparent to one of ordinary skill in the art, that many changes and modifications can be made thereto without departing from the spirit or scope thereof.

What is claimed and desired to be secured by Letters Patent of the United States is:

1. A carboxylated polymer product which comprises:
   (a) 5–80 parts by weight of a monomeric mixture of 1–80% maleic anhydride and 99–20% alkyl acrylate or methacrylate having been polymerized in contact with
   (b) 95–20 parts by weight of an ethylene-vinyl acetate copolymer containing between 5 and 70% by weight vinyl acetate.

2. The product of claim 1, wherein said alkyl acrylate or methacrylate has the structure

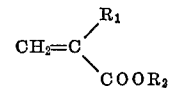

in which $R_1$ is H or $CH_3$ and $R_2$ is an alkyl radical of from one to 20 carbon atoms.

3. A process for producing a carboxylated polymer product which comprises:
   polymerizing 5–80 parts by weight of a monomeric mixture of 1–80% maleic anhydride and 99–20% alkyl acrylate or methacrylate in contact with 95–20 parts by weight of an ethylene-vinyl acetate copolymer having a vinyl acetate content of between 5 and 70% using a free radical polymerization initiator.

4. The process of claim 3, wherein polymerization is effected at a temperature of from 20° to 150° C.

5. The process of claim 3, wherein said free radical polymerization initiator is selected from the group consisting of dialkyl peroxide, diacyl peroxide and peroxyester.

6. The process of claim 5, wherein the initiator is used in amounts of from 0.1 to 10% by weight, based on the weight of maleic anhydride-alkyl acrylate or methacrylate mixture.

7. The process of claim 3, wherein said polymerization is effected in solution using a solvent selected from the group consisting of aromatic and aliphatic hydrocarbon.

References Cited
FOREIGN PATENTS 946,384   1/1964   Great Britain _____ 260—878 R JAMES A. SEIDLECK, Primary Examiner A. HOLLER, Assistant Examiner

UNITED STATES PATENT OFFICE
CERTIFICATE OF CORRECTION

Patent No. 3,749,756　　　　　　　　　Dated July 31, 1973

Inventor(s) Yujiro Kosaka, et al.

It is certified that error appears in the above-identified patent and that said Letters Patent are hereby corrected as shown below:

Column 1, line 4, after "Masaru Uemura," insert --Mitsutaka Saito,--.

Signed and sealed this 27th day of November 1973.

(SEAL)
Attest:

EDWARD M. FLETCHER, JR.　　　　　　RENE D. TEGTMEYER
Attesting Officer　　　　　　　　　　Acting Commissioner of Patents